United States Patent [19]
Hattendorf

[11] 3,809,867
[45] May 7, 1974

[54] SYNTHESIS OF BANK AND PITCH SIGNALS UTILIZING RATE AND ACCELERATION INPUT PARAMETERS

[75] Inventor: Edwin R. Hattendorf, Mission Viejo, Calif.

[73] Assignee: Collins Radio Company, Dallas, Tex.

[22] Filed: Dec. 18, 1972

[21] Appl. No.: 316,214

[52] U.S. Cl. ........ 235/150.2, 235/150.27, 244/77 B, 244/77 E
[51] Int. Cl. .................................. G06g 7/78
[58] Field of Search ....... 235/150.2, 150.26, 150.27; 294/77 G, 77 E, 77 R, 77 B

[56] References Cited
UNITED STATES PATENTS

| 2,827,250 | 3/1958 | Rusler, Jr. ................. 244/77 E |
| 3,512,737 | 5/1970 | Platt et al. ................. 244/77 R |
| 3,132,828 | 5/1964 | Edinger et al. ............. 244/77 G |
| 3,275,268 | 9/1966 | Auld, Jr. .................... 244/77 G |
| 3,283,573 | 11/1966 | Bishop et al. ............... 244/77 G |

*Primary Examiner*—Joseph F. Ruggiero
*Attorney, Agent, or Firm*—Richard W. Anderson; Robert J. Crawford

[57] ABSTRACT

A signal development means for synthesizing bank and pitch attitude signals from rate gyro and accelerometer inputs.

7 Claims, 3 Drawing Figures

SYNTHESIS OF BANK AND PITCH SIGNALS UTILIZING RATE AND ACCELERATION INPUT PARAMETERS

This invention relates generally to a system of measuring bank and pitch in an aircraft and particularly to a system for synthesizing signals proportional to these attitude parameters from acceleration and rate input sensors.

Aircraft ordinarily contain automatic flight controls by which the aircraft can be maintained at a particular attitude or maneuver by measuring the roll and pitch of the aircraft. The measurements are ordinarily made by a vertical gyro reference system with the gyro being oriented in the aircraft such that a single gyro measures roll and pitch attitude. These systems are well known in the art and need not be elaborated upon.

Because of safety considerations it is frequently desirable to include in an aircraft duplicate or redundant control systems, such that the failure of one system does not remove all automatic control from the aircraft. In such instances the backup or redundant systems can then be placed into operation to maintain the aircraft attitude. Because the vertical gyro is an expensive sensing element, it is preferable to utilize a less expensive sensor element in the backup system. As will be more fully disclosed hereinafter, this invention describes a system in which the pitch and roll signals normally provided by the vertical gyro are provided, during a backup mode of operation, by input sensors comprised of a lateral accelerometer, a longitudinal accelerometer, a pitch rate gyro, and a rate gyro so oriented within the aircraft that the rate gyro picks up both yaw rate and roll rate of the aircraft. If the backup mode of aircraft control does not require pitch signal from the normal vertical gyro (such as go-around maneuver which utilizes angle of attack for a pitch axis control) the present invention provides means for a backup aircraft control without the employment of a vertical gyro. Should pitch attitude signal be required, means are provided by the present invention to synthesize pitch from angular rate and longitudinal acceleration input parameters.

Accordingly, it is an object of the present invention to provide a system by which the vertical gyro output signals ordinarily employed in an automatic flight control system may be obtained by synthesis from accelerometer and rate gyro input sensors. A further object of the present invention is the provision of a system in which a rate gyro is mounted in the aircraft such that it picks up both yaw rate and roll rate of the aircraft.

A still further object of the present invention is to provide a system in which the synthesized measurement of aircraft roll is accurate within acceptable limits of the actual roll of the aircraft and is within the state-of-the-art capability of filtering to remove undesirable error. Further objects, features and advantages of the present invention will become apparent from the following description and claims when read with reference to the accompanying drawings in which:

Figure 1:
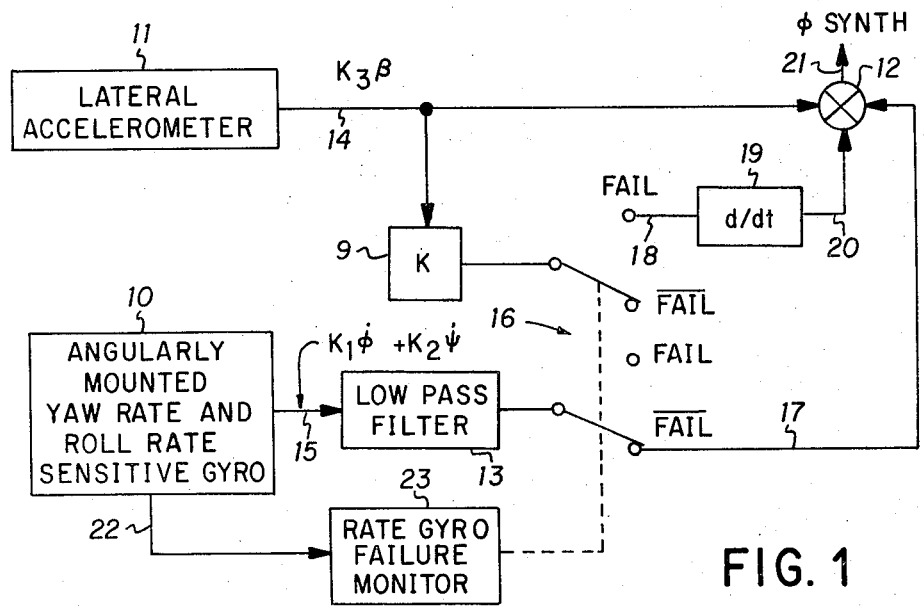
FIG. 1 is a block diagram of the inventive system for synthesis of bank attitude signal.

The side force aircraft equation for aircraft in flight can be approximately written by equating summations of inertial forces to aerodynamic forces as follows:

$$V(\dot{\beta} + \dot{\psi}) - w - g\phi + V\alpha_0\dot{\phi} = K_\beta \beta + K_r\delta_r + K_a\delta_a + K_s\delta_s \quad (1)$$

where:
$V$ = velocity
$\dot{\beta}$ = side slip rate
$\dot{\psi}$ = yaw rate
$\dot{w}$ = wind rate
$g$ = gravity
$\dot{\phi}$ = roll rate
$\alpha_0$ = steady state angle of attack
$\delta_r$ = rudder deflection
$\delta_a$ = aileron deflection
$\delta_s$ = spoiler deflection
$K_a$, $K_r$, and $K_s$ are constants.

The side force Equation 1 can be transposed to solve for bank attitude $\phi$ as follows:

$$\phi = \frac{K_\beta\beta + V(\dot{\beta} + \dot{\psi}) - \dot{w} + V\alpha_0\dot{\phi} - \epsilon}{g} \quad (2)$$

where $\phi$ = true bank and $\epsilon = K_a\delta_a + K_r\delta_r + K_s\delta_s$ and other noise due to lateral wind gusts.

In the ensuing description, Expression 2 will be approximately solved in two general ways; one requiring the differentiation of lateral acceleration, and the other requiring the introduction of roll rate by assuming the rate gyro is mounted so as to pick up both yaw rate and roll rate. Error equations representing the difference between synthesized bank and true bank will be developed for both cases to illustrate that each of two methods of synthesizing roll in accordance with the present invention are flyable. The ensuing discussion will point out that in using roll rate the steering signal is cleaner and more flyable since coupling terms representing aileron and rudder contributions to the side force equation may be equivalently filtered to negligible proportions.

The use of roll rate, as will be borne out in the ensuing discussion, gives the more significant improvement in synthesized bank steering signal and is a preferred synthesis in accordance with the present invention, although it provides an inherent disadvantage, due to the mounting of a rate gyro in a manner so as to pick up both roll rate and yaw rate, and thus pure yaw rate is not then immediately available for later possible use in decrab maneuvers in the aircraft control system.

The bank attitude synthesis to be described, which in itself will be considered as a redundant or backup system to a primary vertical reference system in a given aircraft, will be described in terms of a further redundancy within itself, by offering a primary backup mode utilizing roll rate input parameters and a secondary backup mode, should the rate gyro fail, on the basis of differentiated lateral acceleration.

METHOD I

Synthesized Bank Using Differentiated Acceleration
Assume synthesized bank is calculated as follows:

$$\phi_{\text{synth}} = \frac{1}{g}(-a_y) + \frac{V}{K_\beta g} S(-a_y) + \frac{V}{g}\dot{\psi}$$

Since $a_y$ (lateral accelerometer output) represents all inertial forces and must equal the aerodynamic forces, we can substitute aerodynamic forces for inertial forces, which yields (also assuming $V = V_o$ to ignore error due to different aircraft velocities):

$$\phi_{\text{synth}} = \frac{1}{g}(K_\beta \beta - \epsilon) + \frac{V_0}{K_\beta g} S(K_\beta \beta - \epsilon) + \frac{V_0}{g}\dot{\psi} \quad (3)$$

The expression for true bank, as derived from the side force equation, is repeated as follows:

$$\phi_{\text{true}} = [K_\beta \beta + V(\dot{\beta} + \dot{\psi}) - \dot{w} + V\alpha_o\dot{\phi} - \epsilon]/g \quad (4)$$

Subtracting Equation 4 from Equation 3 yields:

$$\phi_{\text{synth}} - \phi_{\text{true}} = \Delta\phi = \frac{K_\beta\beta}{g} - \frac{\epsilon}{g} + \frac{V_0\dot{\beta}}{g} - \frac{V_0 S\epsilon}{K_\beta g} + \frac{V_0\dot{\psi}}{g}$$

$$-\frac{K_\beta\beta}{g} - \frac{V_0\dot{\beta}}{g} - \frac{V_0\dot{\psi}}{g} + \frac{\dot{w}}{g} - \frac{V\alpha_o\dot{\phi}}{g} + \frac{\epsilon}{g}$$

or $$\Delta\phi = -\frac{V_0 S\epsilon}{K_\beta g} - \frac{V\alpha_o\dot{\phi}}{g} + \frac{\dot{w}}{g} \quad (5)$$

From Equation 5 it can be noted that wind shear w contributes directly to error in bank as does roll rate $\dot{\phi}$, although the roll rate term is quite small. Aerodynamic terms ($\epsilon$) due to rudder, aileron and lateral wind gusts appear as differentiated error.

METHOD II

Synthesized Bank Utilizing Roll Rate
Repeating again the side force equation:

$$\phi_{\text{true}} = [K_\beta \beta + V(\dot{\beta} + \dot{\psi}) - \dot{w} + V\alpha_o\dot{\phi} - \epsilon]/g \quad (6)$$

Rewriting Equation 6 becomes:

$$\phi_{\text{true}} = [V\beta(K_\beta/V + S) + V\dot{\psi} - \dot{w} + V\alpha_o\dot{\phi} - \epsilon]/g$$

Multiplying both sides by $(K_\beta/V)/(S + K_\beta/V)$, where $S \neq -K_\beta/V$, yields:

$$\phi_{\text{true}} \frac{K_\beta/V}{S + K_\beta/V} = \frac{K_\beta\beta}{g} + \frac{K_\beta\dot{\psi}}{g(S + K_\beta/V)}$$

$$- \frac{K_\beta\dot{w}}{gV(S + K_\beta/V)} + \frac{K_\beta\alpha_o\dot{\phi}}{g(S + K_\beta/V)} - \frac{K_\beta\epsilon}{gV(S + K_\beta/V)}$$

and $S\phi/(S + K_\beta/V)$ to both sides:

$$\phi_{\text{true}} = \frac{\phi K_\beta/V}{S + K_\beta/V} + \frac{S\phi}{S + K_\beta/V} = \frac{K_\beta\beta}{g} + \frac{K_\beta\dot{\psi}}{g(S + K_\beta/V)}$$

$$- \frac{K_\beta\dot{w}}{gV(S + K_\beta/V)} + \frac{K_\beta\alpha_o\dot{\phi}}{g(S + K_\beta/V)}$$

$$- \frac{K_\beta\epsilon}{gV(S + K_\beta/V)} + \frac{S\phi}{(S + K_\beta/V)}$$

or $$\phi_{\text{true}} = \frac{\phi(S + K_\beta/V)}{S + K_\beta/V} = \frac{K_\beta\beta}{g} + \frac{K_\beta\dot{\psi}}{g(S + K_\beta/V)}$$

$$+ \frac{\dot{\phi}(K_\beta\alpha_o/g + 1)}{(S + K_\beta/V)} - \frac{K_\beta\dot{w}}{gV(S + K_\beta/V)} - \frac{K_\beta\epsilon}{gV(S + K_\beta/V)}$$

$$\phi_{\text{true}} = \frac{K_\beta\beta}{g} + \frac{K_\beta\dot{\psi}/g + \dot{\phi}(K_\beta\alpha_o/g + 1)}{(S + K_\beta/V)}$$

$$- \frac{K_\beta\dot{w}/gV}{(S + K_\beta/V)} - \frac{K_\beta\epsilon/gV}{(S + K_\beta/V)} \quad (7)$$

Assume that for this case, synthetic bank is calculated as follows:

$$\phi_{\text{synth}} = \underbrace{\frac{1}{g}(K_\beta\beta - \epsilon)}_{\text{accelerometer}} + \underbrace{\frac{K_\beta/g\dot{\psi} + \dot{\phi}(K_\beta/g\alpha_0 + 1)}{(S + K_\beta/V)}}_{\text{rate gyro}} \quad (8)$$

Subtracting Equation 7 from Equation 8 yields:

$$\phi_{\text{synth}} - \phi_{\text{true}} = \Delta\phi = \frac{K_\beta\beta}{g} + \frac{K_\beta\dot{\psi}/g + \dot{\phi}(K_\beta\alpha_0/g + 1)}{(S + K_\beta/V)}$$

$$- \frac{K_\beta\dot{w}/gV}{(S + K_\beta/V)} - \frac{K_\beta\epsilon/gV}{(S + K_\beta/V)} - \frac{K_\beta\beta}{g} + \frac{\epsilon}{g}$$

$$- \frac{K_\beta/g\dot{\psi} + \dot{\phi}(K_\beta\alpha_0/g + 1)}{(S + K_\beta/V)}$$

or $$\Delta\phi = \frac{K_\beta\dot{w}/gV}{(S + K_\beta/V)} - \frac{K_\beta\epsilon/gV}{(S + K_\beta/V)} + \frac{\epsilon/gS + K_\beta/V\epsilon/g}{(S + K_\beta/V)}$$

$$= \frac{K_\beta\dot{w}/gV - K_\beta\epsilon/gV + \epsilon/gS + K_\beta\epsilon/gV}{(S + K_\beta/V)}$$

$$\Delta\phi = \frac{K_\beta/V}{(S + K_\beta/V)}\left[-\frac{\dot{w}}{g} + \frac{V_0}{K_\beta g}S\epsilon\right] \quad (9)$$

Note that Equation 9 for case II is a filtered version of Equation 5 for case I, and also that the roll rate term is eliminated. Since $K_\epsilon/V$ is generally a very small number, typically 0.0985, the error equation yields very small errors. The wind shear would have to be sustained for a long period of time since the effective low pass has approximately a ten second time constant.

From the above it is seen bank can be approximated by orienting a rate gyro so that it senses both yaw and roll rates. However, since the same gyro senses both yaw rate and roll rate, it is necessary to show that separate measurements of these rates are not required. With the rate gyro and lateral accelerometer mounted in the orientation shown in FIG. 2 and with the use of a low pass filter with a corner frequency of $K_\beta/V$ radians, the synthesized bank was written as Equation 8 above.

The error Equation 9 of Method II above is seen to be free from all roll ($\phi$) and roll rate ($\dot{\phi}$) terms. The most significant term in the error Equation 9 is $K_\beta/V$. Typical values of $K_\beta/V$ are less than 0.1 and therefore the major term is easily filtered out in a ten-second low pass filter. The other terms of Equation 9 are multiplied by the $K_\beta/V$ term and therefore are also quite small.

The error of the synthesized roll therefore is not of sufficient magnitude to negate the utility of the system.

Figure 2:
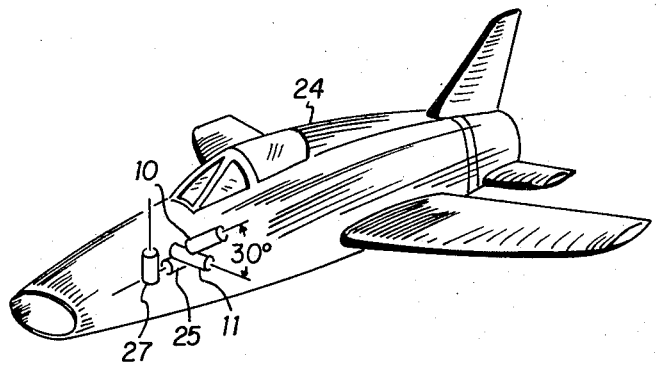
FIG. 2 is a schematic drawing revealing the orientation of a rate gyro and lateral accelerometer within the aircraft.

The rate gyro which senses both yaw and roll rate is mounted at a predetermined angle in the aircraft as illustrated in FIG. 2. Because both roll rate ($\dot{\phi}$) and yaw rate ($\dot{\psi}$) are taken from the same rate gyro 10, it is necessary to determine the mounting angle. Using typical numbers as derived from simulator computer runs, the rate gyro contribution to bank becomes $6\dot{\psi} + 10.3\dot{\phi}$. This defines a ratio of 6/10.3 which is approximately equal to the tangent of 30 degrees. Thus the rate gyro 10 is mounted in a particular orientation of about 30° which eliminates the need of separate measurements of roll rate and yaw rate. As illustrated in FIG. 2 the rate gyro 10 is mounted with its axis oriented 30° from the roll rate axis. This orientation is a function of airspeed, since, in arriving at Equation 9, the $V$ term of Equation 7 was equated to the $V_o$ term of Equation 8. However velocity correction can be built into the system within the purview of those skilled in the art.

Implementation of Bank Synthesis

A bank angle synthesis defined by the above-described methods I and II is functionally depicted in FIG. 1. FIG. 2 illustrates an aircraft 24 with the angularly mounted yaw rate and roll rate sensitive gyro 10 mounted such that the sensitive axis lies perpendicular to the longitudinal axis of the aircraft and parallel to the transverse axis of the aircraft. The rate gyro 10 is mounted such that the spin axis of the gyro is at an angle of 30° from the transverse axis of the aircraft and perpendicular to the longitudinal axis of the aircraft. As above mentioned this mounting angle may be changed according to expected speed of the aircraft.

With reference to FIG. 1, the system of synthesizing bank angle from each of Methods I and II above is depicted. Lateral accelerometer 11 provides an output 14 defined as $K_3\beta$. The output 15 of the rate gyro 10 ($K1\dot{\phi} + K2\dot{\psi}$) is passed through a low pass filter 13 and selectively through switch 16 (in the illustrated position thereof) to provide a first input 17 to an output mixer 12. The $K_3\beta$ output 14 from the lateral accelerometer 11 provides a second input to mixer 12 in the illustrated mode, and the output from mixer 12 comprises the signal corresponding to synthesized bank, $\phi$. Filter 13 filters out the major terms of Equation 9, above, such that the output of the summation network 12 is the synthesized bank angle of the aircraft. At typical aircraft speeds for go-around maneuver, filter 13 could be a ten-second low pass filter; consequently, a wind shear which is significant with respect to ten seconds is required before wings level accuracy is affected. The system, as depicted in FIG. 1, thus synthesizes bank angle from lateral acceleration and rate gyro inputs based on the above-defined method II in the illustrated position of mode switch 16.

The system of FIG. 1 provides a self-contained control redundancy, in that, upon failure of the angularly mounted yaw and roll rate sensitive gyro 10 which is employed in the preferred synthesis, a rate gyro failure monitor 23 through interconnection 22 with the rate gyro 10 might switch mode switch 16 to the FAIL position, whereupon inputs to signal combining means 12 become the output 14 from lateral accelerometer 12 and differentiated lateral accelerometer output 20, to satisfy a synthesis in accordance with the above-defined method I, based on Expression 3 for synthesized bank.

Synthesis of Pitch Angle

Figure 3:
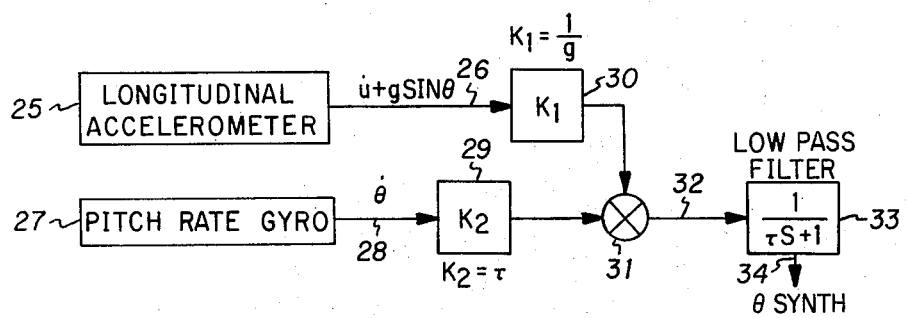
FIG. 3 is a block diagram of the synthesis of pitch from longitudinal acceleration and pitch rate input parameters.

As depicted in FIGS. 2 and 3, the aircraft may further include a longitudinal accelerometer 25 and a pitch rate gyro 27 suitably mounted with respect to the axes of the aircraft to provide a longitudinal acceleration signal 26 ($\dot{u} + g \sin \theta$) which is passed through a gain function 30 to a signal combining means 31. Pitch rate gyro 27 may provide a pitch rate signal 28 ($\dot{\theta}$) which is passed through a gain function 29 as a second input to mixer 31. The output 32 from mixer 31 is applied through a relatively long time constant (for example, 60 sec) low pass filter 33 which provides a $\theta_o$ output 34 (reference pitch attitude output). In operation, low pass filter 33 functions as an approximate integration function which does not drift with time due to imperfections associated with pure integration as rate gyro standoffs. If gain factor $K_2$ is made equal to Y, pitch rate $\dot{\theta}$, when passed through low pass filter 33 becomes $\Delta\theta$ (incremental pitch) over the range of frequencies of interest (but not for all frequencies). This compromise is needed to avoid hardware imperfections cited above.

Now, if $K_1$ is made equal to $1/g$, and considering the small angle approximation that $\sin \theta \cong \theta$, the body-mounted longitudinal accelerometer signal, when passed through the long time-constant low pass filter 33, becomes approximately $\theta_o$, the steady-state pitch value.

Thus the long time-constant low pass filter 33 averages out the $\dot{u}/g$ signal, which, in the longrun, must be zero, and averages out the $\sin \theta$ signal component to give approximately $\theta_o$, while providing the approximate integration of $\dot{\theta}$ to give $\Delta\theta$.

Mathematically:

$\theta = \theta_o + \Delta\theta$ by definition, where $\theta_o$ is steady state pitch and $\Delta\theta$ is incremental pitch $\theta\text{synth} = [(\dot{u} + g \sin \theta)K_1 + \dot{\theta}K_2][1/(YS + 1)]$ If $K_1 = 1/g$ and $K_2 = Y$;

$\theta\text{synth} = (\dot{u} + g \sin \theta)(1/g)(1/YS + 1) + \dot{\theta}[Y/(YS + 1)]$ $\cong \theta_o + \Delta\theta$ (for frequencies of interest)

Therefore:

$\theta\text{synth} \cong \theta$

The present invention thus provides a means for synthesizing, from acceleration and rate input sensors, signals usable as flyable backup attitude signals in lieu of employing a second vertical reference to satisfy this redundancy.

Although the present invention has been described with respect to particular embodiments thereof, it is not to be so limited as changes might be made therein which fall within the scope of the invention as defined in the appended claims.

I claim:

1. A system for synthesizing the roll attitude of an in-flight aircraft comprising first means for measuring the roll rate and yaw rate of said aircraft, said first means comprising a rate gyro mounted at a predetermined angle with respect to the transverse axis of said aircraft and perpendicular to the longitudinal axis of said aircraft, second means for measuring the side slip of said aircraft, low-pass filter means for filtering the output of said rate gyro to remove major error components therefrom, signal summation means for combining the outputs of said second means and said low-pass filter means into a combined signal said combined signal being a synthesized measurement of the roll attitude of said aircraft.

2. The system of claim 1 wherein said second means comprises an accelerometer.

3. The system of claim 2 wherein said filtering means comprises a low pass filter and said predetermined angle is substantially 30°.

4. The system of claim 2 comprising a signal rate deriving means, switching means, a first position of said switching means connecting the output of said filtering means to said signal summation means, a second position of said switching means disconnecting said aforedefined connection and connecting the output of said accelerometer to said rate deriving means, the output of said rate deriving means being connected to said signal summation means, and means responsive to failure of said rate gyro to effect said second position of said switching means.

5. A system for synthesizing the pitch attitude of an in-flight aircraft comprising first means for measuring the longitudinal acceleration of said aircraft, second means for measuring the rate of change of pitch of said aircraft, signal combining means, the outputs from said first and second means being applied to said signal combining means, low pass filtering means having a long time constant receiving the output of said signal combining means, and the output of said low pass filtering means comprising said signal proportion to the pitch attitude of said aircraft.

6. The system of claim 5 wherein the outputs from said first and second means are passed through respective first and second signal translating means as inputs to said signal combining means.

7. The system of claim 6 wherein said low pass filtering means has a transfer function of $1/(YS + 1)$, said first signal translating means has a gain factor equal to $1/g$, where $g$ is the acceleration of gravity, and said second signal translating means has a gain factor equal to $Y$.

* * * * *

UNITED STATES PATENT OFFICE
CERTIFICATE OF CORRECTION

Patent No. 3,809,867  Dated May 7, 1974

Inventor(s) Edwin R. Hattendorf

It is certified that error appears in the above-identified patent and that said Letters Patent are hereby corrected as shown below:

Column 2, line 7 - change "w" to --$\dot{w}$--

Column 3, line 30 - change "w" to --$\dot{w}$-- line 31 - change "$\phi$" to --$\dot{\phi}$-- line 51 - delete "and $S\phi/(S + k/V)$ to both sides" and substitute therefor -- add $S\phi/(S + K_\beta/V)$ to both sides -- line 67 - change "w" to --$\dot{w}$--

Column 4, lines 35 & 37 - delete the expression and substitute the following $$\Delta\phi = \frac{-K_\beta \dot{w}/gV}{(S + K_\beta/V)} - \frac{K_\beta \epsilon/gV}{(S + K_\beta/V)} + \frac{\epsilon/g\ S + K_\beta/V\ \epsilon/g}{(S + K_\beta/V)} =$$

$$\frac{-K_\beta \dot{w}/gV - K_\beta \epsilon/gV + \epsilon/g\ S + K_\beta \epsilon/gV}{(S + K_\beta/V)}$$

Column 6, line 17 - change "$\gamma$" to --T-- line 34 - change "$\theta$" to --$\dot{\theta}$-- line 38 - change "$\gamma S$" to --TS-- line 40 - change "$1/\gamma S$" to --1/TS--
change "$\gamma/(\gamma S$" to --T/(TS--

Column 8, line 15 - change "$1/(\gamma S + 1)$" to --$1/(TS + 1)$-- line 19 - change "$\gamma$" to --T--.

Signed and sealed this 24th day of September 1974.

(SEAL)
Attest:

McCOY M. GIBSON JR.
Attesting Officer

C. MARSHALL DANN
Commissioner of Patents